Figure 1:
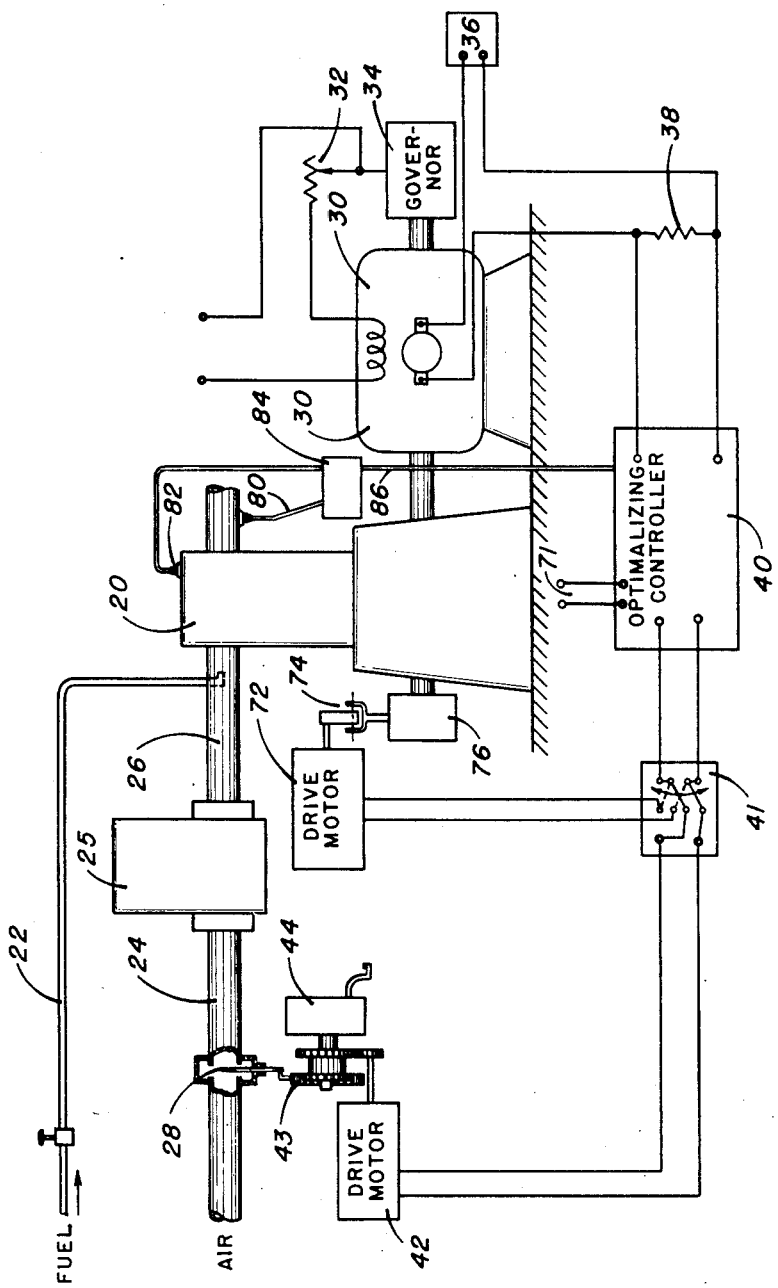

Feb. 17, 1953  C. S. DRAPER ET AL  2,628,606
CONTROL SYSTEM
Filed June 24, 1950  8 Sheets-Sheet 1

INVENTORS
Charles Stark Draper + Yao Tzu Li
BY Kenway, Jenney
Witter + Hildreth,
attys.

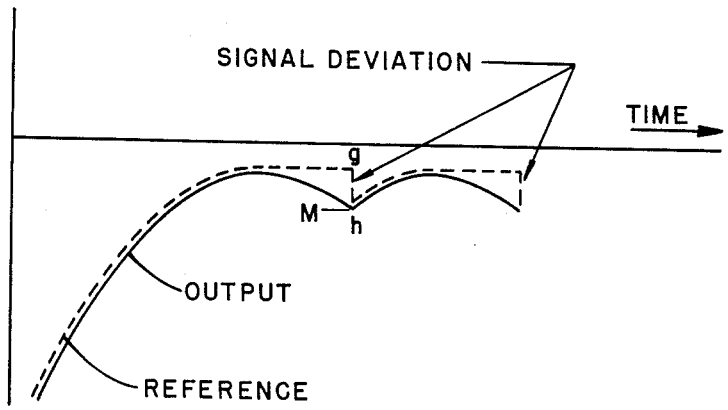
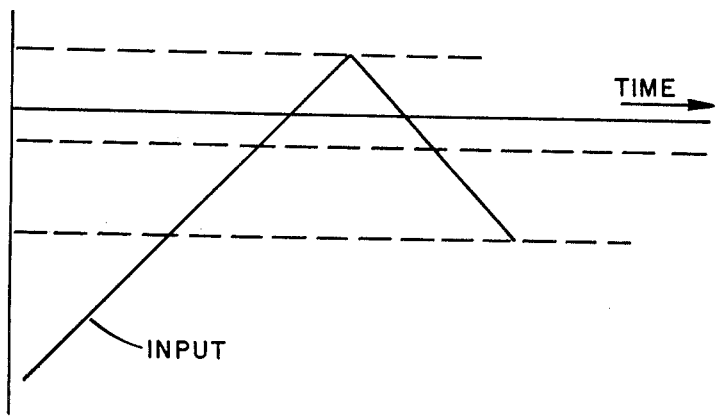
*Fig. 9*

Patented Feb. 17, 1953

2,628,606

UNITED STATES PATENT OFFICE 2,628,606

CONTROL SYSTEM

Charles Stark Draper, Newton, and Yao T. Li, Cambridge, Mass., assignors to Research Corporation, New York, N. Y., a corporation of New York Application June 24, 1950, Serial No. 170,164

22 Claims. (Cl. 123—102)

The present invention relates to control systems and has for its object the control of input quantities to a system in a manner to afford optimum performance for a selected output quantity.

An example of a system in which the foregoing object may be realized is that of an airplane engine operating under level flight conditions and with fuel supplied at a constant rate. A number of factors enter into optimum performance but it may be considered that the fuel-air ratio is one of the most important. According to the present invention this ratio is continually adjusted automatically to give the maximum performance. Some quantity must be selected for optimization and in the example chosen it will suffice to work with the speed of the airplane: thus, the invention contemplates the continuous automatic control of the fuel-air mixture to maintain the maximum speed of the aircraft.

From this simple example it will be seen that the present invention differs markedly from the usual servo or regulator systems. In the first place, the servo or regulator system works against a fixed reference quantity; for example, a governor operates to maintain a fixed speed or a positional gun control operates to maintain the gun in accurate angular correspondence with a sighting device. The present invention differs in that the reference quantity is not pre-determined but is a variable which is to be maximized.

Control for optimum operation has been effected manually, since in the example of flying an aircraft the pilot will continually adjust the fuel-air ratio for what he considers to be maximum performance. The automatic control is, however, preferable but is attended with serious difficulties. Established servomechanism and regulator techniques are not available, not only because of the absence of determined reference quantities as stated above, but also because the operation is essentially non-linear and does not lend itself to established methods of analysis.

With the foregoing object in view, the present invention contemplates control means for varying an input quantity, together with means for measuring an output quantity to be optimized, and searching or hunting devices for effecting continuous variations in the input and for maintaining the input at or near such values that the maximum or optimum output value is attained. Three specific forms of the invention systems have been devised and are briefly described as follows although the invention is not limited thereto.

1. *Output derivative control.*—In this system the output is continuously differentiated with respect to time and the derivative is smoothed by means of suitable filter circuits. The actuating input is intermittently reversed in direction, under the control of a signal which is related to the time rate of change of the output. In the preferred form of this system, which may be termed an "output sampling" method, the output signals are periodically compared with the integral of the output signal over successive timed intervals, whereby a desirable smoothing effect is attained.

2. *Test frequency.*—A test signal of small amplitude, preferably sinusoidal, is introduced into the input and the neighborhood of the optimum is determined by a reversal of phase of that part of the output that is due to the test signal.

3. *Peak holding control.*—This system operates by continually forcing the input in one direction so long as the output quantity is increasing, and then comparing the output with the maximum output attained until a certain deviation quantity is reached, whereupon the direction of the input is reversed and the peak reference is reset for the next cycle of hunting for the maximum from the other side of the peak.

These three systems operate on similar principles; thus, each operates on the "peak-searching" principle, in that the output is continually swept through slight variations in the neighborhood of the optimum, and the input is continually adjusted by the control in a sense to bring the output toward the optimum. The first two systems above mentioned are essentially "derivative" controls, since they depend on principles similar or analogous to mathematical differentiation, while the last named, the peak-holding system, operates on principles more closely allied with the mathematics of "finite differences," since the output signal is compared with a peak which has been previously established within the hunting cycle.

It is important that the frequency of hunting or searching for the maximum differ markedly from any resonant frequencies in the system and also from many interference effects, both of which for purposes of this discussion may be considered as "noise." Thus, in an internal combustion engine there are certain high-frequency effects due to non-uniformity in the torque over a full revolution. It is necessary that the peak-searching system, however it may be constructed, will not be affected by these variations. Furthermore, the presence of low frequencies must be recognized as inherent in the operation of the engine, as for example in the case of drift or what may be termed "secular" changes. The searching frequency should preferably be intermediate to the high and low frequencies thus described.

A further feature of the present invention consists in means whereby an output which is dependent on two or more inputs may be optimalized. Preferably the system operates by optimalizing the output in respect to one of the inputs, then shifting the control for the optimalization with respect to the second input, and so on, the various inputs being controlled in like manner over a full cycle.

Figure 2:
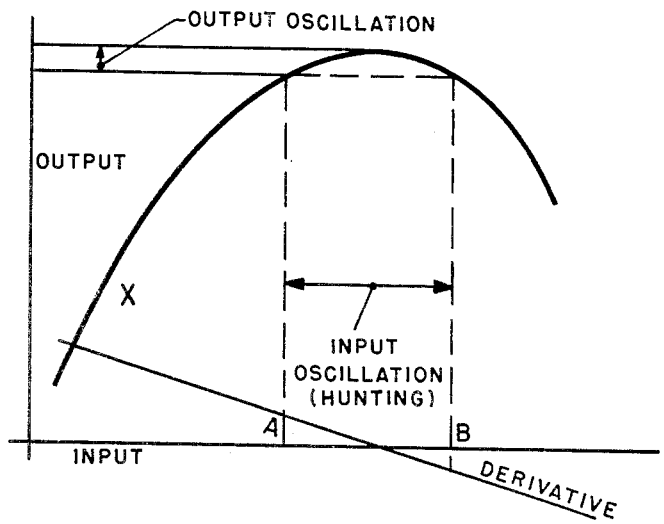
Figure 3:
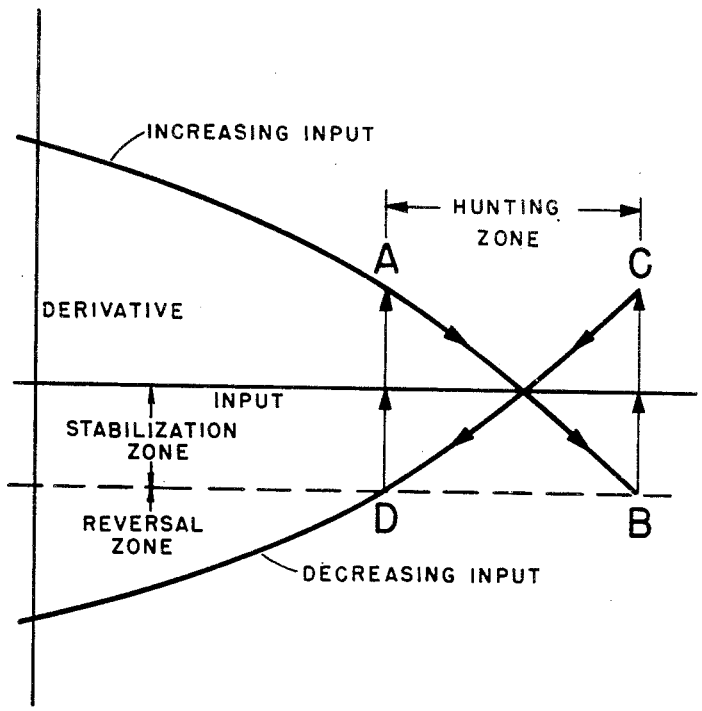
Figure 4:
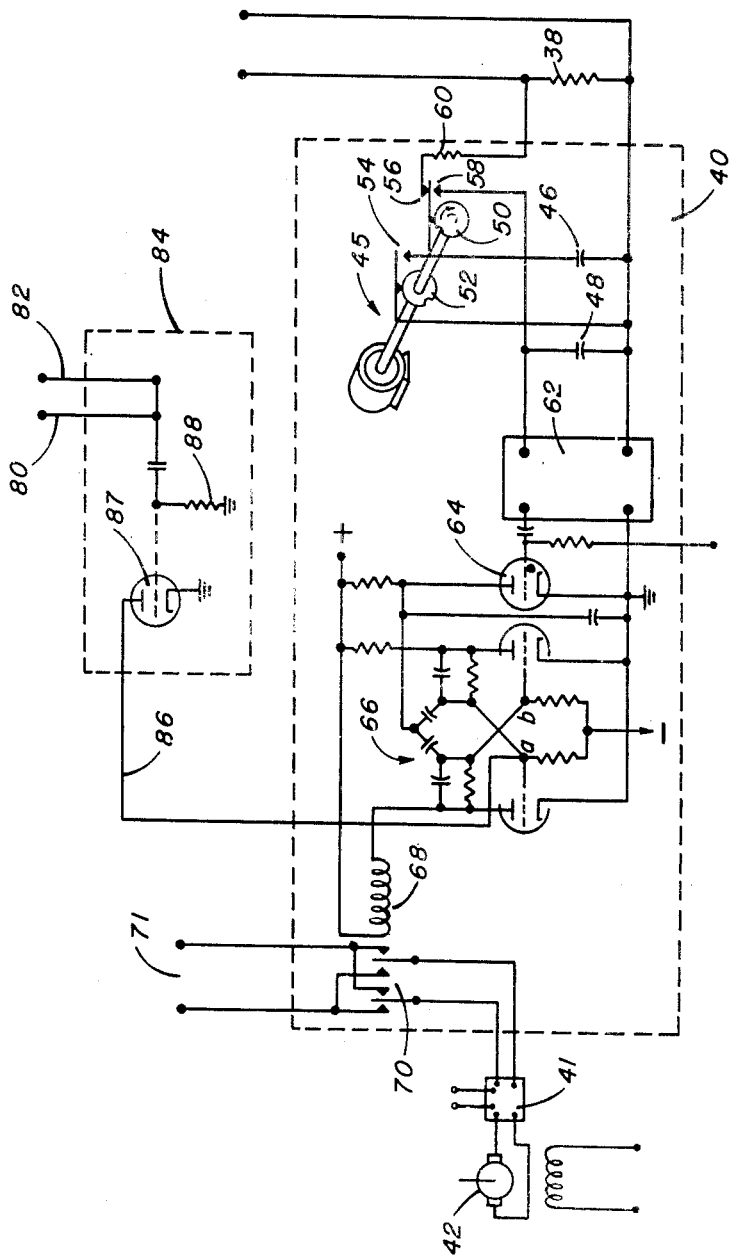
Figure 5:
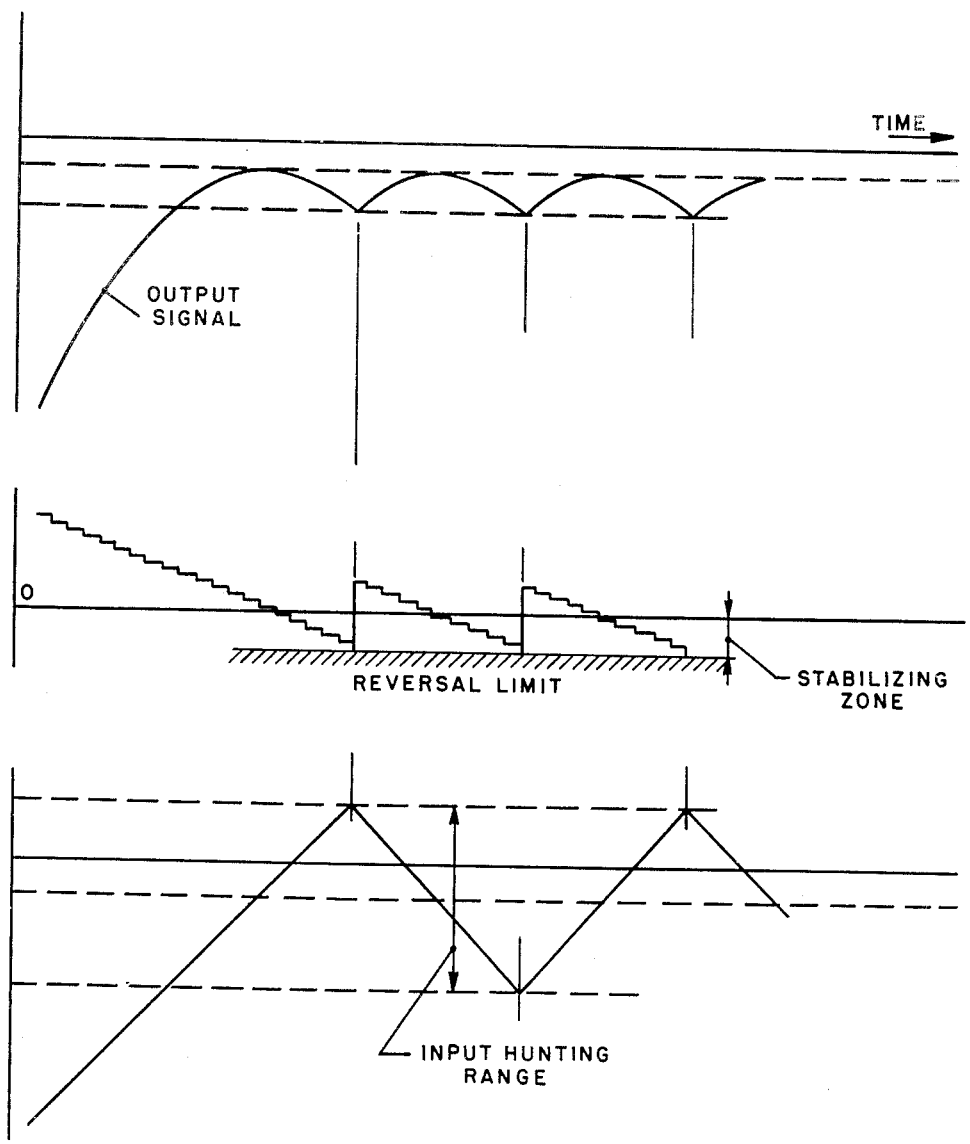
Figure 6:
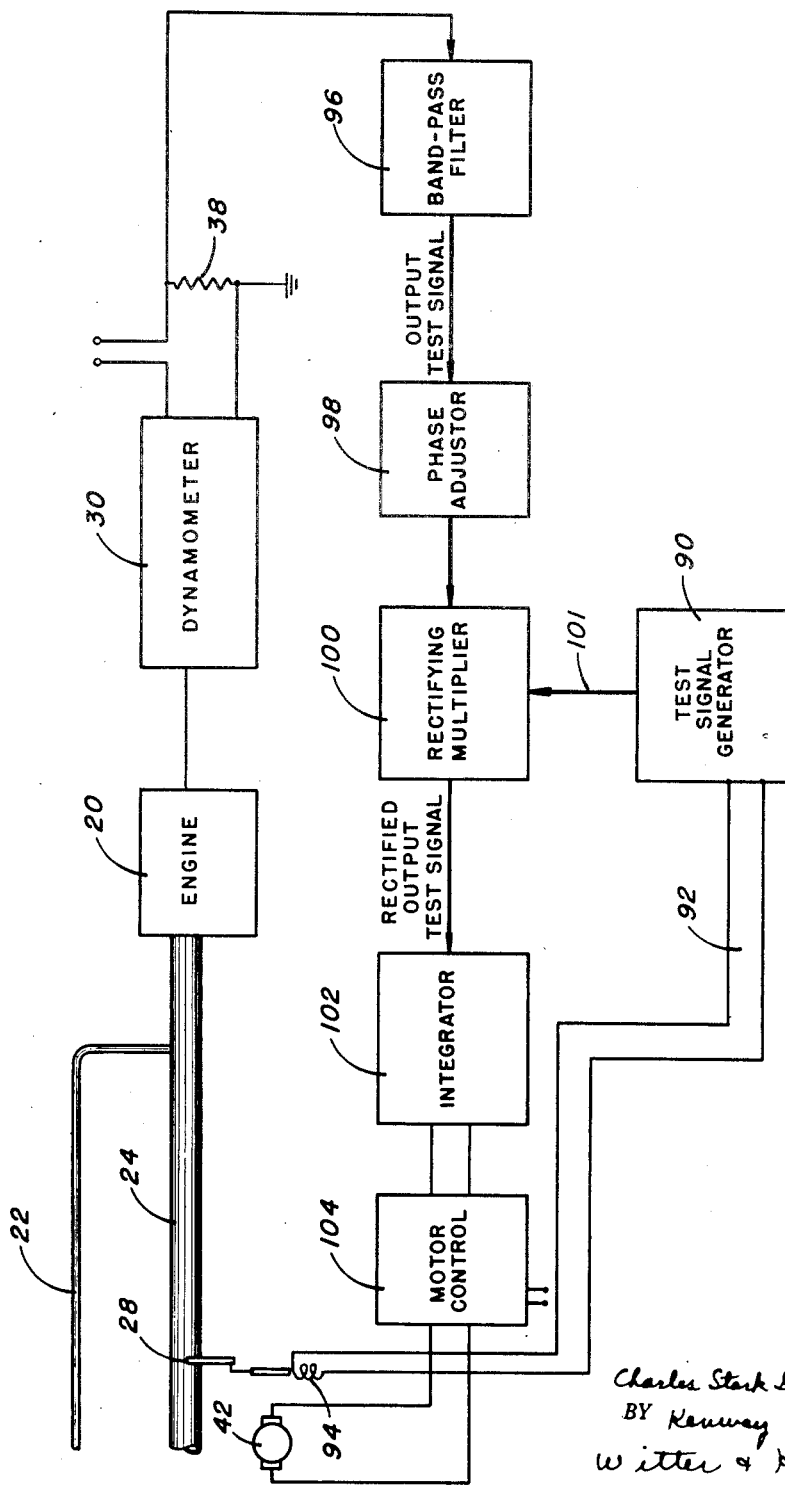
Figure 7:
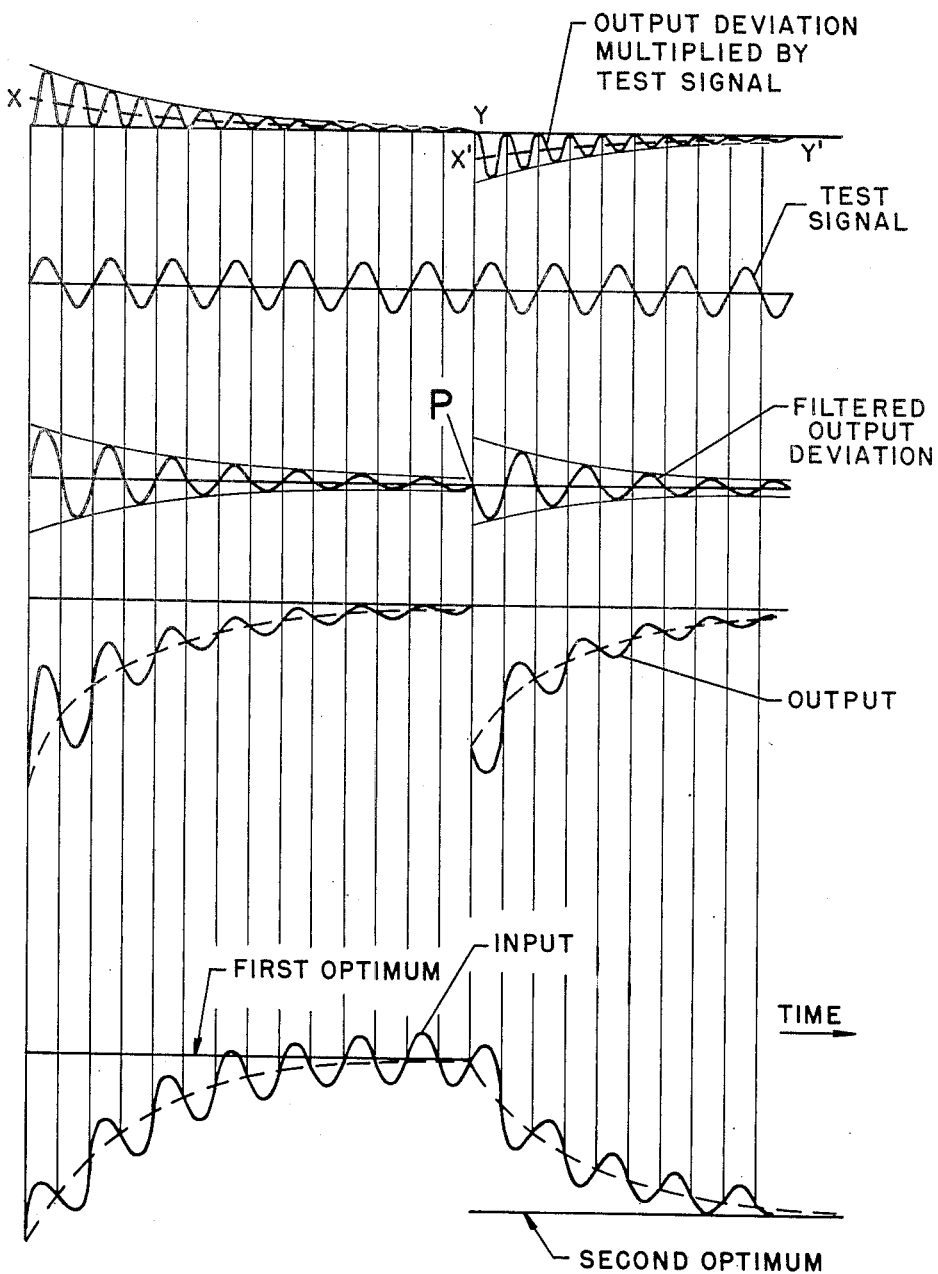
Figure 8:
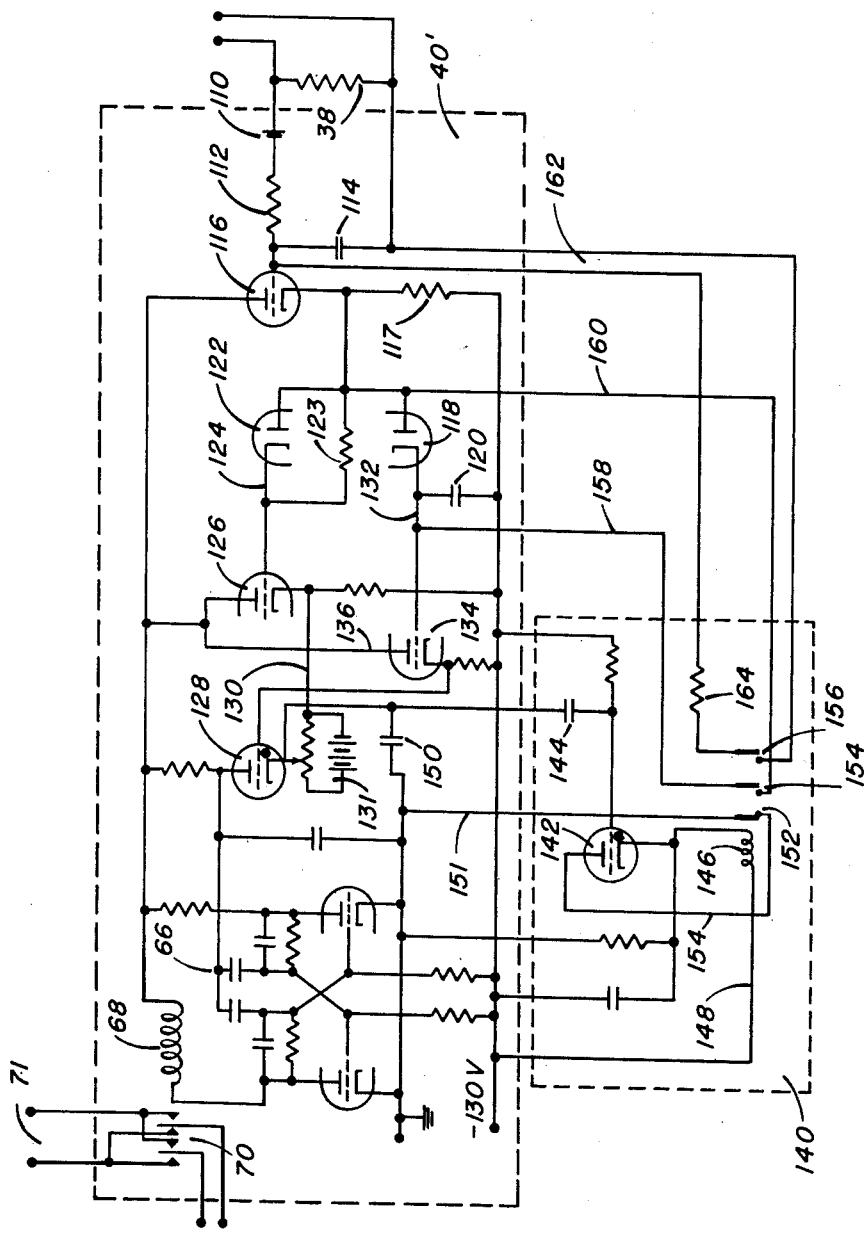

In the accompanying drawings, Fig. 1 is a diagram of a system for optimalizing the output of an internal combustion engine embodying the general principles of the present invention; Figs. 2 and 3 are diagrams illustrating the operation of the system; Fig. 4 is a diagram of the preferred circuit for the output sampling type of system; Fig. 5 is a graphical representation of a typical sequence of operating cycles according to the system of Fig. 5; Fig. 6 is a diagram of a system for the test signal type of control; Fig. 7 is a graphical representation of the operation of the system of Fig. 6; Fig. 8 is a diagram of the preferred system for peak-holding operation; and Fig. 9 is a graphical representation of the operation of the system of Fig. 8.

The invention will first be described as applied to an optimalizing control for an internal combustion engine. The system is shown diagrammatically in Fig. 1. It comprises an engine 20 having a fuel supply line 22, an air supply line 24, a surge tank 25 to smooth out excessive fluctuations in air flow, and an air intake manifold 26. It is assumed that the fuel supply is maintained constant, that is, fuel is supplied to the engine at a constant rate. The air is adjusted by a throttle 28. According to the invention, the throttle 28 is subjected to continual adjustment to maintain a certain maximum output. The output to be optimalized is to some extent a matter of choice, but in the case of an engine, will usually be power or torque or some quantity related thereto. In the case of an engine driving a fan or propellor, as in the case of an aircraft engine operating under conditions of uniform air temperature and density, a simplification may be made by controlling for maximum speed. For greatest generality however, a control for torque or power may be desirable and accordingly in Fig. 1 the output quantity which is to be optimalized is torque at constant speed. To this end the engine shaft drives an electrodynamometer 30 in which the field winding is excited through a rheostat 32 controlled by a governor 34. The armature of the dynamometer is connected to a suitable power-absorbing system 36 in the usual manner. A resistor 38 is connected in series with the load, whereby the voltage across the resistor is a signal representing the dynamometer torque. This voltage is fed into a system 40 designated "optimalizing controller," the output of which is connected through a selector switch 41, to be described later, with a motor 42 which operates through suitable gearing 43 to move the throttle 28 in one direction or the other in the line 24. An over-riding manual control device 44 may be provided, whereby the throttle may be manually set, regardless of the automatic control, for use in starting or for emergency operation.

The system 40 operates through peak-searching or peak-hunting, to determine the point at which the torque is a maximum, that is to say, the air adjustment drive motor 42 is continually operated to maintain the air adjustment in the neighborhood of the point at which the selected output quantity (torque) is a maximum. The system 40 may take several forms, which are now to be described.

*Derivative control*

In Fig. 2 there is shown a typical curve, giving the relationship between the changes in the actuating input and the output. In this case the input quantity (air-to-fuel ratio) is plotted as abscissae and the output quantity (torque) as ordinates. The curve of Fig. 2 is illustrative only and need not correspond to any actual functional relationship between these quantities; in fact, the relation need not be known and it is only necessary that it should have a defined maximum. The input, namely, the volume of air (and hence the air-fuel ratio, since the fuel is fed at a constant rate) is subjected to oscillations in the indicated range, whereupon the output quantity, namely torque, will oscillate as indicated by the variation in ordinates. At each point, the "derivative" is measured. When the derivative is increasing the system 40 operates to drive the motor in a direction to increase the input quantity, and when the peak is passed and the derivative changes to negative, the direction of the motor drive reverses. As will be subsequently pointed out, the extent of the input oscillation, that is, the hunting range, is determined in such a manner as to give definite assurance of finding the peak, but without excessive variations in output. If the operating point is indicated at X, considerably at one side of the peak, the input is of course not to be limited to a definite oscillation, but must continue in such a manner that the output will definitely rise to the peak. The derivative of output against input is also plotted in Fig. 2, showing that the derivative changes from a positive value at A, the lower end of the hunting range, to a negative value at R, the upper end of the range.

In Fig. 3 there is plotted a typical cycle of hunting operations. The derivative of the output is plotted against the input. Two derivative curves are required, one for increasing input and one for decreasing input. At point A, corresponding to A in Fig. 2, the input is increasing and the curve from A to B is traced out steadily. At B, the stabilization zone limit, the direction of change of input is reversed and the operation is transferred to point C on the other curve. The reversal from B to C is brought about by the fact that the sign of the input drive is changed from curve AB to curve CD. From C the derivative goes down the curve to another negative value at D which is at the end of the stabilizing zone, whereupon the input is again reversed to shift the operation back to the point A for the beginning of another cycle.

The preferred circuit by which these results are attained is shown in Fig. 4. This circuit does not directly differentiate the output. Differentiation of the output may be obtained by simple differentiating circuits, but since direct differentiation is affected by undesirable interference, it is preferred to use what may be termed an output sampling system, which is mathematically analogous to differentiation, but includes an integrating or smoothing effect. This is accomplished by comparing the time integral of the engine torque over a test time interval with the time integral of torque over a preceding test interval of equal period. Since the test interval is relatively small in comparison with the period of the hunting cycle, an action quite similar to differentiation is obtained.

Turning now to Fig. 4, this system comprises the resistor 38 across which the voltage appears as the signal representing the instantaneous torque. The resistor is connected to the system 40 which is shown enclosed in dash lines in Fig. 4. It includes a cycle sequence switch indicated generally at 45 with test condenser 46 and a reference condenser 48. The cycle sequence switch is driven by a motor, and has two cams 50 and 52, the latter being provided with contacts 54 for momentarily short-circuiting the condenser 46 at one point in the cycle. A movable contact controlled by the cam 50 is normally in engagement with a fixed contact 56 connected with the input resistor 38, but is adapted to be momentarily connected with the condenser 48 through a contact 58. The reference condenser 48 is connected to an amplifier and to the control circuit in a manner to be presently described. A resistor 60 is connected between the resistor 38 and the contact 56.

By rotation of the cams of the cycle sequence switch the test condenser 46 is first connected through the resistor 60 across the output signal resistor 38 for a number of cycles of the internal combustion engine. When the cam 50 reaches the point that its movable contact engages contact 58 the test condenser is connected across the reference condenser, to equalize the voltages of the two condensers. The cam 50 then lifts its contact to isolate the condenser 46 from contact 58, and immediately thereafter the cam 52 momentarily closes its contact 54 to short circuit the condenser 46, whereupon a new cycle is started.

As a result of the continual repetition of this sequence, the charge on the test condenser 46 is a measure of the average torque during the previous revolution of the cycle sequence switch. The period is sufficient to cover a number of cycles of the engine 20. Therefore, if the torque changes, the voltage on the condenser 46 changes for successive cycles of the switch. In view of the fact that a cycle of the sequence switch corresponds to a number of cycles of the engine, the condenser voltage serves as a measure of the smoothed engine torque for that period. If the average torque is constant over long periods, the reference condenser 48 will maintain a constant voltage, but if the torque is changing, there will be a sudden change of the voltage on the reference condenser 48 when the test condenser is momentarily connected across it. This change of reference condenser voltage may be considered as a "pulse," which has the sign of and is of a magnitude proportional to the derivative of the torque, or rather, the derivative of the smoothed or averaged torque. This pulse is amplified and passed into the control circuit. The circuit is such that if the voltage pulse has a positive sense, showing that the torque has increased during the preceding sequence, no action occurs; on the other hand, if the pulse of voltage is negative, the circuit is actuated to operate a reversing switch which controls the motor 42 to drive the throttle in the reverse direction.

The reference condenser is connected to an amplifier 62 which is connected to a thyratron or other ignition-type tube 64, the output of which is connected to a flip-flop circuit 66 of conventional form. The amplifier connections are such that so long as no pulses or only positive pulses are received from the reference condenser, a negative voltage is applied to the grid of the thyratron 64, but a negative pulse from the reference condenser is amplified and applied as a positive pulse to the grid of the thyratron 64. Stated in another way, the thyratron grid is maintained negative so long as the reference condenser voltage is constant or increasing, but goes positive when the reference condenser voltage shows a decrease. This positive pulse on the grid fires the thyratron and activates the flip-flop circuit. A relay 68 has its winding connected in the plate circuit of one of the tubes of the flip-flop circuit. The relay has double-pole double-throw contacts 70 which are closed in one position when the relay is deenergized but are closed in the other direction when the relay is energized. Thus, successive activations of the flip-flop circuit simply result in successive shifts of the reversing contacts 70. The contacts 70 control the direction of the current from a D. C. supply 71 to the armature of the drive motor 42. Reversal of the current results in reverse energization of the motor 42 and therefore drives the throttle valve in the reverse direction.

From the foregoing, it will be seen that so long as the torque is increasing, the throttle is moved in the same direction (A toward B in Fig. 3) but when a decreasing derivative of sufficient magnitude is detected to fire the thyratron 64, the flip-flop circuit is actuated to reverse the motor 42, thereby transferring control to C, so that the peak is again searched until the limit D of the hunting zone is reached, whereupon the motor is reversed again. This cycle is repeated continually.

*Additional controls*

The system thus far specifically described operates to optimalize the output solely by control of the air supply. It is possible to optimalize against several independent variables, of which ignition timing may be considered as one. To this end, the optimalizing controller 40 is arranged to operate either the air adjustment drive motor 42, or a drive motor 72, which is connected through suitable linkage 74 with the ignition timer 76, by which the spark advance is controlled. The selection between motors 42 and 72 if effected by a selector switch 41 operating on a fixed sequence. The switch comprises simply a double-pole double-throw switch which first connects the output of the controller 40 with the drive motor 42 and then with the timing adjustment drive motor 72, and continually repeats this sequence. This may be accomplished by any suitable motor drive. The selector switch operates at a frequency considerably lower than that of the cycle sequence switch 44; in other words, the selector switch 41 allows the cycle sequence switch 44 to operate over several of its cycles before shifting from one drive motor to the other. Since the switch 44 has a single cycle for a considerable number of cycles of the engine 20, the switch 41 will be seen to operate at very much reduced frequencies compared to the engine.

It will be understood that while the peak-searching operation is being carried out with the timing adjustment motor, the air adjustment drive motor is stopped, and this occurs within the "hunting zone" and hence near the output peak as determined by the air adjustment drive.

The operations of dual control are therefore similar to partial differentiation in mathematics, whereby the function is differentiated separately with respect to two or more independent variables. In other words, all of the independent variables but one are held constant, and that one is allowed to sweep through its peak-searching values. After the output has been maximized for that variable, the control is shifted to the other variables in sequence. The control is shown for two variables in Fig. 1, but may be extended to three or more independent variables, as will be clear from the preceding description.

Limit controls

In the operation of an internal combustion engine, it has been found that misfiring of the engine and detonation effects may occur if the ratio of air to fuel is increased too greatly or if the spark is too far advanced. Under certain circumstances both detonation and misfiring may occur within the hunting range. It is therefore desirable to provide means for effecting reversal of the drive motor upon occurrence of either detonation or misfiring, even though the limit of the hunting zone has not been reached. To this end the engine is provided with a misfiring detector 80 which is constructed to give a signal when the exhaust pressure sequence is disturbed. The engine is also provided with a detonation detector 82 which may be of the form described in the copending application of Li, Serial No. 120,316, filed October 8, 1949. Electrical circuits from the detectors 80 and 82 are fed into an amplifier 84 which is connected with the optimalizing controller 40 through a line 86.

As shown in Fig. 4 the control system 84 comprises a thyratron tube 87 in which the grid is normally negatively biased through a resistor 88 and is adapted to be brought to a positive potential whenever a signal is introduced from 80 or 82. The connection 86 leads from the plate of the thyratron to such a point in the flip-flop circuit as will cause reversal in the event of excessive leaning of the mixture or excessive spark advance. This is shown at $a$ in Fig. 4. The connection to a single point of the flip-flop circuit allows limit reversal only when the mixture is on the lean side of the peak or the spark is on the advance side of the peak, because dangerous stalling or excessive detonation exists only on the side of too lean a mixture or too advanced a spark. Since these limits occur for the same directions of change of the variable for both detonation and misfiring, a single amplifier 84 which is connected to one point of the flip-flop circuits suffices for this particular case. However, and more generally, if one limit control is to operate at one side of the peak and another limit control at the other side of the peak, one would be connected to the point $a$ as indicated, and a separate amplifier would be provided which would be connected to the point $b$.

Operation of derivative control

The results of the peak-searching operations are illustrated by the graphs of Fig. 5 in which typical input and output variations are plotted against time. The input is varied as a function of time in the manner indicated by the bottom graph, the input hunting range being as indicated. The middle graph represents the variation in "derivative," the stepped form of the curve occurring by reason of the averaging effect brought about by the use of the condensers 46 and 48 and the cycle sequence switch 44. It will be understood that the true derivative of output against input could be measured by apparatus familiar to those skilled in the network art and this derivative could be fed into the amplifier 62, in which case the middle curve of Fig. 5 would not have the stepped form. However, for reasons previously given, the averaging effect brought about by the use of the cycle sequence switch 44 and the condensers 46 and 48 is desirable because the system is less subject to interference from high frequency perturbations. The length of each step represents the sampling period, namely, the period of operation of the cycle sequence switch 44.

The upper graph at Fig. 5 represents a typical variation in output. It will be observed that the output sweeps through the optimum and falls slightly below the optimum, then upon reversal increases to the optimum again, and so on through a continual succession of cycles. By the present invention, the output is automatically maintained in the immediate neighborhood of the optimum at all times.

The legend "stabilizing zone" in the middle curve represents the value of derivative necessary to effect reversal. It will be understood that, in theory at least, the reversal could be effected immediately upon detection of the change in sign of the "derivative." To make the system so sensitive, however, would result in undesired reversals due to what has been defined above as "noise," namely, interference and fluctuation effects. The thyratron circuit is therefore adjusted to provide a "stabilization zone," in which the flip-flop circuit will not operate until the output has fallen from the peak by an amount greater than the expected noise in the system.

From the foregoing description the system may be viewed as one which utilizes two types of input variations, namely, a peak-searching variation and an adjustment variation. Thus, the sawtooth oscillation within the "input hunting range" may be viewed as a kind of test oscillation, and so long as the external conditions remain constant, the motor 42 will operate in a manner to execute only those oscillations. (The actual form of the oscillations is not important, but the linear form of Fig. 5 is simplest to generate.) Under starting conditions, however, or when the external conditions are varied to call for a new optimum, the motor is required to move unidirectionally for a considerable distance, as is indicated by the left part of Fig. 5; this may be considered as the adjustment variation. In the actual system of Fig. 1, the means by which these two types of variations are generated are not entirely independent, since the motor 42 is conveniently used for both.

Test signal control

Instead of detecting the change of sign of the derivative by comparison of the output with that of a preceding period, the change may be detected by a somewhat different principle to be presently described, namely, by the use of a test frequency generator. In this system a test generator is used to generate a small oscillating test signal, which is used to cause a small oscillation in the input quantity; thus in the above example the throttle valve is actually oscillated to produce fluctuations in the volume of air supplied to the engine. The output quantity (torque in the above example) is modified by the test frequency. A signal proportional to instantaneous torque is obtained and is fed through a band-pass filter, which is designed to pass the test frequency.

The output signal from the filter is multiplied by a reference signal of the same frequency as the test signal. This system is essentially a phase sensitive rectifier and its operation is based on the fact that the oscillation in the reference signal is substantially in phase with the output signal when the input is below optimum, but is essential 180° out of phase when the input lies above the optimum. The product of the filter output signal and the reference signal gives a signal which is proportional in magnitude, and is in the same sense as, the derivative of output with respect to input. This signal is then used as a means to control the peak-searching drive motor.

The preferred form of apparatus for this embodiment of the invention is illustrated in Fig. 6. In Fig. 6 many of the elements which are of conventional form are shown as a block diagram. The system is shown as applied to the internal combustion engine 20 having the fuel and oil supply lines 22 and 24 and the throttle 28 as in Fig. 1. The motor 42 is used to control the position of the throttle and is to be operated to search continually for the peak.

The torque is measured by the dynamometer 36 and the instantaneous torque is measured as a voltage across the resistor 38 as in Fig. 1.

The system includes a test signal generator 90, capable of producing small oscillations at a suitable frequency. The output of this generator is fed through lines 92 to a mechanical oscillating device 94 shown simply as a solenoid which is suitably associated with the throttle gearing to make the throttle 28 undergo slight fluctuations. The frequency of the fluctuations is of some importance since they should be somewhat lower than the engine frequency. It will be understood that high frequency variations in the air supply may not be accurately followed by the engine itself. Since the invention depends on variations in torque, at such a frequency, it is necessary that the test frequency be one to which the engine will respond. While this test signal system may be satisfactorily employed for operation of certain high speed internal combustion engines, the frequency limitations may be rather difficult to meet for lower speed engines. The system is most advantageous for higher frequency applications as, for example, in optimalizing controls for high frequency power generation. However, for reasons of consistency, the system is described as applied to the optimalizing control of an internal combustion engine.

The output of the dynamometer resistor 38 is fed to a band pass filter 96 which passes the test signal frequency, but cuts off higher and lower frequencies.

The output of the filter 96 is fed to a phase adjustor 98 which is of conventional form and is designed to compensate for the lag in the system and for the filter characteristics at the test frequency. The output of the phase adjustor is fed to a rectifying multiplier 100 to which an output of the test signal generator is also fed through a line 101. The multiplier circuit 100 is a conventional form and utilizes a multiplier tube by which the output torque variations are multiplied by the reference signal fed into the line 101, which signal is at the same frequency as the output.

This system is amenable to mathematical treatment, which, however, is rather difficult because of the non-linear character of the system. In brief, assuming a sinusoidal variation of the test signal representable as $\sin \omega t$, the output at 98 (suitably corrected for phase) is also of the form $\sin \omega t$. The output of the multipler 100 is of the form $\sin^2 \omega t$, with the plus or minus sign prevailing depending on whether the input is less than or greater than the value which produces the optimum output. The amplitude of the sinusoidal variation of the multiplier 100 is proportional to the corresponding derivative of the output-input relationship of the controlled system.

The output of the rectifying multiplier is fed to an integrator 102 serving as a smoothing circuit, and its output is fed to the motor control circuit 104 which is of any suitable form to dictate the direction and speed of rotation of the throttle control motor 42 depending on the above-mentioned phase relation of the integrated output. The speed of the throttle control motor 42 preferably varies in proportion with the magnitude of the output of the multiplier and the direction of rotation according to the sign of the same output.

The results are shown graphically in Fig. 7 wherein the variation of input is shown in the bottom curve. The "adjustment" variation is shown in dash lines, and the total variation is shown in solid lines. The total variation is the adjustment variation plus the "peak-searching" variation at test frequency, which is here shown as a sine wave. The output is shown by the next curve above, which of course exhibits slight variations due to the test frequency.

The filtered output deviation is shown by the next curve. The variations in the dash-line curves are such that, under conditions of no noise and no external changes, the filtered output deviation tends toward zero magnitude. This condition is approached in a generally exponentially manner, as shown in the three lower curves of Fig. 7. If the condition of zero magnitude were ever actually reached, the "adjustment" variation of input would also be zero, and the only change of input would be the test oscillation. This condition is represented approximately at point P. From this point a change in external conditions is assumed, so that a new optimum is called for. The actual input at P is now above the second optimum, and there is a change in phase of the filtered output deviation. To detect this change of phase, the deviation is multiplied by the test signal itself, and the product is shown in the uppermost curve. The integrator 102 smooths the curve into dotted lines XY and X'Y'. The change from XY to X'Y' effects control of the direction of the motor. If the second optimum were above the first optimum, there would be no change of phase, and the input would be adjusted in the same direction as before to come up to the new optimum level.

Although the system operates under constant external conditions, in theory at least, by adjusting the input until the output deviation comes to zero, rather than by causing the output to sweep back and forth through the optimum, nevertheless in practice unavoidable external changes, even though small, will continually call for new optima, and therefore the input will be subject to continual reversals in a manner similar to that of the previously-described system.

An important advantage of the test signal mode of control is that simultaneous control of more than one independent variable may be effected by the use of two separate control circuits operating at different test frequencies. It is therefore not necessary to use the selector switch to shift control from one variable to another as in Fig. 1, although that procedure may be used if desired.

*Peak holding system*

A modified and in some respects preferable system for controlling the reversals of the input drive motor 42 is illustrated in Fig. 8. This is a peak-holding system in which the input is continually forced in one direction so long as the output quantity is increasing. When the output quantity reaches its maximum a reference quantity is maintained at that maximum and the actual output is compared with said reference until a certain deviation quantity is reached, whereupon the direction of the input is reversed and the peak reference is reset. This form of system has been found to be the most satisfactory system so far devised for controlled systems with high lever of noise.

The system of Fig. 8 starts with the dynamometer output resistor 38, the voltage across which is proportional to the instantaneous torque. The engine and the fuel and air supplies, the dynamometer and related parts are identical with the parts shown in Fig. 1 and are not repeated in Fig. 8. The voltage across 38 is fed into the optimalizing controller designated 40'.

Since only the variations in voltage across the resistor 38 are important, it is desirable to buck out most of the D. C. voltage. This is most simply done by a battery 110. The resultant voltage is fed a low-pass smoothing circuit including a resistor 112 and a condenser 114 to an amplifier tube 116. The tube 116 is connected in cathode-follower relation to an output resistor 117. The voltage across the resistor 117 is a slowly fluctuating signal which serves as a measure of the variations in output. This signal is fed through two paths, as follows: first, through a diode 118 to a reference condenser 120, and second, through a diode 122 whose characteristics match those of the diode 118. The diode 122 is paralleled by a high resistance 123. The diode 122 is connected by a line 124 with the grid of a triode 126, of which the cathode is connected to the cathode of a thyratron or other ignition tube 128 through a connection 130. A firing adjustment control is provided for the thyratron by means of the conventional battery and potentiometer circuit 131.

The reference condenser 120 is connected by a line 132 with the grid of a triode 134, the plate circuit of which is energized in common with that of the triode 126. A cathode-follower connection 136 runs from the cathode of the tube 134 to the grid of the thyratron 128.

Before proceeding with the description of the remaining parts of the circuit a brief explanation of the circuits thus far described will be given. As the potential across the resistor 117 increases, the potential across the condenser 120 also increases, as does the potential on the grid of triode 126. During the period of increasing potential, the cathode potentials of the tubes 126 and 134 remain substantially equal owing to the balance of tubes 118 and 122 and of tubes 126 and 134. Thus no firing potential is applied to the grid of the thyratron 128. However, as the potential across resistor 117 passes through the maximum and starts to fall, the potential on the grid of tube 126 will also fall, as will the potential of the cathode of the thyratron. On the other hand, the potential of the reference condenser 120 will remain at its peak notwithstanding a reduction of potential across 117, since the condenser 120 cannot release any charge in the back direction through the diode 118. Hence the grid of thyratron 128 becomes relatively more positive with respect to the cathode until a sufficient positive deviation is reached, at which time the thyratron fires. The firing of the thyratron is used to reverse the input drive motor and also to reset the reference circuit.

The foregoing operations are shown graphically in Fig. 9. The input is shown as a function of time in the same manner as in Fig. 5. The output is shown in the upper graph as the solid line. The output reference is shown in dash lines. When the potential at 124 is equal to that on the condenser 120 the solid curve and the dash curve coincide. This coincidence is maintained until the maximum output is reached. Thereafter the output falls off as indicated at M while the reference potential is maintained at its value corresponding to optimum output. The deviation between the dash curve and the solid curve represents the potential on the grid of the thyratron 128 in respect to the cathode. When this deviation becomes sufficient as represented by the short vertical line *gh* in Fig. 9 the thyratron fires. The value of the potential *gh* should be greater than any noise expected in the system whereby false reversals will be avoided. Additional cycles then proceed as indicated in Fig. 9.

The parts of the circuit of Fig. 8 by which reversal of the input drive motor and resetting of the reference circuit are obtained will now be described.

The reversal of the motor is effected through the flip-flop circuit 66 which controls the reversing relay 68 having the contacts 70. These parts are identical with similarly numbered parts in Fig. 1. As in Fig. 1 the reversal of the contacts 70 results in reversal of the drive motor.

The resetting of the reference voltage is accomplished by the resetting circuit indicated generally at 140. It comprises a thyratron 142 whose grid is connected through a condenser 144 with the cathode of thyratron 128. The cathode of thyratron 142 is connected through the winding of a relay 146 with the negative supply line by wire 148. When the thyratron 128 fires its cathode potential rises sufficiently by reason of the drop through a condenser 150 to transmit a firing pulse through condenser 144 to the grid of thyratron 142. The plate circuit of the thyratron 142 includes a connection 151 from ground through contacts 152 of the relay 146 and thence through a connection 154 to the plate. Contacts 152 are normally closed, but when the thyratron 142 fires the plate current passes through a circuit 152, 154, the thyratron 142, the relay winding 146 and the connection 148 to the negative terminal. This momentarily opens the contacts 152 and thus removes the positive potential from the plate of the thyratron 142. At the instant the contacts 152 are opened two sets of contacts designated 154 and 156 are closed. Contacts 152 are connected by lines 158 and 160 with the high potential end of the reference condenser 120 and the plate of diode 118, respectively. Thus, when contacts 154 are closed the reference condenser 120 discharges through the diode 118 until the potential at 132 is substantially equal to that at 124. Owing to the matching impedances of diodes 118 and 122, the partial discharge of condenser 120 brings the potentials of lines 124 and 132 into coincidence. This is the operation that results in bringing the reference potential from $g$ to $h$ in Fig. 9.

Closure of the contacts 156 results in a discharge of the smoothing condenser 114 through lines 162 and a resistor 164. This discharge of the smoothing condenser 114 brings the curve representing "output" in Fig. 9 down to point $h$ for start of a new cycle; otherwise the curve might bridge over above point $h$ and give a false reading in the neighborhood of maximum.

It will be understood that the sharp rise in the cathode potential of thyratron 128, when that tube fires, results in a quick cut-off of the tube. Hence, although the relay 146 is deenergized immediately after its energization so that contacts 152 are immediately closed, there is no firing potential on the grid of thyratron 142 and the tube will not reignite until the next reversal is called for.

Conclusion

From the description of the several systems, it will be seen that they have in common a number of features, namely, the provision of means for providing "peak-searching" variations in input in opposite directions, together with an "adjustment" variation, whereby the input is steadily varied in the direction necessary to approach the optimum from one side or the other. In any case the output is measured to detect the neighborhood of the optimum, and its variations are utilized to control the adjustment variation of input. In the derivative and peak-holding systems, the peak-searching variations are preferably effected by reversals of the drive motor under control of the output-measuring devices, while in the test-frequency system, these variations are independently generated.

In any case, the variations are controlled as to amplitude and frequency in a manner to diminish, so far as possible, any disturbing effects of noise. The peak-searching variations should preferably exceed the noise in amplitude and differ therefrom in frequency. In general, the peak searching frequency will be lower than noise frequencies, and little difficulty will be experienced in that regard.

It is also essential that the peak-searching effects will not be influenced by slow changes or drifts in operation of the system. For example, a change in altitude of an airplane will result in a new optimum, and consequently a variation in the input will in general have to be made. Variations of this kind occur over relatively long periods of time and may be considered as "low frequency" variations. In practical operation there is no difficulty in selecting a searching frequency which will be sufficiently separated from both the low frequency drifts and by the high frequency noise to permit satisfactory automatic control for substantially optimum performance. The present invention differs essentially from servo or regulator apparatus, which operates against a fixed reference, whereas the present invention operates against a variable reference which is determined by the conditions under which optimum output is obtained. There is a further distinction in that while servo systems may be adequately analyzed according to linear theory, the present invention is essentially non-linear. This can be seen from the graphical representations of Figs. 5 and 9 wherein the variations are necessarily caused to take place in a region where the input-output relation is definitely non-linear. A detailed analysis of operation according to conventional theory is difficult if not impossible, since according to linear standards, the systems are ones that would be inherently unstable; in fact, stability is achieved only by the fact that a measurement against the optimum is necessarily made in order to effect a reversal, because otherwise the input would continue to change in a direction to move away from the optimum.

The features of optimalizing against several independent inputs, and of providing limit controls, have been described as applied to only one form of the invention but are of general application, as will be clear to those skilled in the art. In other respects also the invention is not limited to the particular embodiments herein shown and described but in its more general aspects comprehends control apparatus for establishing a variable reference in accordance with an optimum value of output, and for continuously varying the input to cause the output to oscillate in the region of said optimum. It will also be understood that although the search for a maximum has been used as an example herein, the actual quantity which is optimized will depend on how the problem is set up. It follows from elementary principles of calculus that minimization of a chosen output quantity (e. g., fuel consumption) and maximization of its inverse (e. g. fuel economy) are identical in substance, since each refers to a zero-slope or zero-derivative condition.

Having thus described the invention, we claim:

1. Automatic control apparatus for a system in which an output quantity is dependent on an input quantity, comprising means for introducing peak-searching variations in opposite senses into the input quantity, input-adjustment means for steadily varying the input quantity in either direction, means for generating a signal output which is a measure of the output quantity, means for detecting changes in the rate of increase of said signal output with respect to a variation of the input quantity, and means activated by a change in the rate between positive and negative for operating the input-adjustment means in a direction toward the zero-derivative signal output.

2. Automatic control apparatus for a system in which an output quantity is dependent on an input quantity, comprising means for introducing peak-searching variations in opposite senses into the input quantity, input-adjustment means for steadily varying the input quantity in either direction, means for generating a signal output which is a measure of the output quantity, means for establishing a reference signal dependent on the maximum preceding value of the signal output, means for detecting a deviation between said reference and the instantaneous signal output, and means activated by a negative deviation for operating the input-adjustment means in a direction toward the zero-derivatives signal output.

3. Apparatus according to claim 1 having means activated by such a change in the rate for generating the peak-searching variations in the input.

4. Automatic control apparatus for a system in which an output quantity is dependent on an input quantity, comprising means for generating at successive times a signal output which is a measure of said output quantity, means for continuously varying the input quantity, means for measuring the difference between the instantaneous value of the signal output and a previously measured value of the signal output as the input is steadily varied in one direction, and control devices operated when said difference changes from positive to negative to reverse the direction of variation of the input quantity.

5. Automatic control apparatus for a system in which an output quantity is dependent on an input quantity, comprising means for continuously varying the input quantity, measuring apparatus for generating a signal output which is a measure of said output quantity, said measuring apparatus having provision for averaging the signal output over a test period, means for comparing the averaged signal output with the averaged signal output in a preceding test period, and devices operated when the later-averaged signal output is less than the previous average signal output to reverse the direction of variation in the input quantity.

6. Automatic control apparatus for a system in which an output quantity is dependent on an input quantity and which contains means for varying the input quantity, comprising measuring apparatus for repeatedly generating a signal output which is a measure of said output quantity, a controller having provision for averaging the signal output over a test period and means for comparing the averaged signal output with the averaged signal output in a preceding test period, and means responsive to the occurrence of an averaged output quantity less than that of the output measured over a preceding period to activate the reversing devices.

7. Automatic control apparatus for a system in which an output quantity is dependent on an input quantity, comprising a test-frequency generator for introducing peak-searching oscillations into the input quantity, means for steadily varying the input quantity in either direction, detecting means for generating a signal dependent on changes in the output due to said oscillations, and means for detecting the phase angle between the output oscillations and the input oscillations, means for correcting the phase angle for system lags and means activated by changes in the corrected phase angle as the input quantity is steadily varied in one direction to change the direction of the steady variation of the input quantity.

8. Automatic control apparatus for a system in which an output quantity is dependent on an input quantity, comprising a test-frequency generator for introducing peak-searching oscillations into the input quantity, means for steadily varying the input quantity in either direction, detecting means for generating a signal which is a measure of changes in the output due to said oscillations, and means responsive to changes in the phase and amplitude of said signal as the input is steadily varied in one direction to activate the steady-varying means to cause a steady variation of input in a direction determined by the phase of said output oscillations and at a rate determined by the amplitude of said signal.

9. Automatic control apparatus for a system in which an output quantity is dependent on an input quantity, comprising a test-frequency generator responsive to an electric input for introducing peak-searching oscillations into the input quantity, means for steadily varying the input quantity in either direction, detecting means for generating a signal which is a measure of changes in the output due to said oscillations, phase-sensitive devices to detect a reversal in phase angle between said signal and said oscillations as the input quantity is steadily varied in one direction, said phase-sensitive devices including a multiplier for multiplying the signal by the electrical input causing the test-frequency oscillations, and means activated by the phase-sensitive devices on the occurrence of a phase reversal to determine the direction of the steady variation of the input quantity.

10. Automatic control apparatus for a system in which an output quantity is dependent on an input quantity, comprising measuring apparatus for periodically generating a signal which is a measure of said output quantity, means for continuously varying the input quantity in one direction, means for subtracting the instantaneous signal from a previously-generated signal as the input is steadily varied in one direction, and means operated by the differences between them to effect a reversal of the input variation.

11. Automatic control apparatus for a system in which an output quantity is dependent on an input quantity comprising means for continuously varying the input quantity in one direction, means for generating a signal which is a measure of the output quantity, means for establishing a reference signal which, when the output quantity is decreasing, is equal to the peak signal output as the input is varied steadily in one direction, and means controlled by the deviation of output signal from the reference signal to reverse the direction of variation of the input quantity.

12. Automatic control apparatus for a system in which an output quantity is dependent on an input quantity comprising means for continuously varying the input quantity in one direction, means for generating a signal which is a measure of the output quantity, means for establishing a reference signal which is a measure of the output quantity while the output is increasing and which is a measure of the peak output while the output quantity is decreasing, reversing devices controlled by the deviation of the output signal from the reference signal to change the direction of variation of the input quantity, and resetting devices to re-establish the reference signal upon said reversal.

13. Automatic control apparatus for a system in which an output quantity is dependent on an input quantity, comprising measuring apparatus for repeatedly generating a signal which is a measure of said output quantity, peak-searching means for varying the input quantity in opposite senses, means for detecting decreases in said signal as the input quantity is varied in one sense and means activated by said decreases to reverse the direction of variation of said input quantity, and limit control devices operable upon incipient malfunctioning to reverse the direction of input variation irrespective of attainment of peak output.

14. Automatic control apparatus for an engine in which an output quantity is dependent on an input quantity, comprising measuring apparatus for repeatedly generating a signal which is a measure of said output quantity, peak-searching means for repeatedly varying the input quantity in opposite senses to vary the output signal through an optimum, and means activated by changes in output signal to effect adjustment variations in the input quantity toward the optimum.

15. Automatic control apparatus for an internal combustion engine in which an output quantity is dependent on the air-to-fuel ratio, comprising measuring apparatus for repeatedly generating a signal which is a measure of said output quantity, a valve for controlling the air-fuel ratio, peak-searching means for repeatedly varying the valve in opposite senses to vary the output signal through an optimum, and means activated by changes in output signal to effect said variations in the valve, means for detecting incipient malfunctioning of the engine due to excessive leaning of the mixture, and means operable on such detection to reverse the direction of throttle movement independent of the peak-searching operation.

16. Automatic control apparatus for an internal combustion engine in which an output quantity is dependent on the ignition timing, comprising measuring apparatus for repeatedly generating a signal which is a measure of said output quantity, a timer, peak-searching means for repeatedly varying the timer in opposite senses to vary the output signal through an optimum, and means activated by changes in output signal to effect said variations in the timer, means for detecting incipient malfunctioning of the engine due to excessive spark advance, and means operable on such detection to reverse the direction of throttle movement independent of the peak-searching operation.

17. Automatic control apparatus for a system in which an output quantity is dependent on two or more input quantities, comprising measuring apparatus for repeatedly generating a signal which is a measure of said output quantity, peak-searching means for repeatedly varying a selected one of said input quantities in opposite senses to vary the output signal through an optimum, means responsive to a change from positive to negative in the rate of change of the output signal as the input is steadily varied in one direction to effect adjustment variations of said input quantity toward optimum, and selector means for periodically shifting the peak-searching means from one input to another.

18. In automatic control apparatus of the character defined in claim 6 in which the measuring signal is an electric signal, a controller comprising a test condenser and a reference condenser, means for connecting the output measuring means to the test condenser to charge it to a value proportional to the measuring signal, means for periodically connecting the test and reference condensers to equalize their charges, and means responsive to a change in the reference condenser voltage in one direction only to operate the reversing devices.

19. In automatic control apparatus of the character defined in claim 6 in which the measuring signal is an electric signal, a controller comprising a test condenser and a reference condenser, means for connecting the output measuring means to the test condenser to charge it to a value proportional to the output quantity, means for periodically connecting the test and reference condensers to equalize their charges, a flip-flop circuit, means for generating single pulses from changes in reference condenser voltage in one direction only, means causing said pulses to activate the flip-flop circuit, and means responsive to changes in state of the flip-flop circuit to activate the reversing devices.

20. Automatic control apparatus for a system in which an output quantity is dependent on an input quantity comprising means for continuously varying the input quantity, measuring means for converting the output quantity to an output voltage, means for establishing a reference quantity equal to the peak output while the output quantity is decreasing, said means including a reference condenser to receive increments of charge from the measuring means thereby raising the reference condenser voltage to a peak value and a rectifier to prevent loss of charge from the reference condenser, comparing devices for determining the deviation of the output voltage from said peak reference condenser voltage, reversing devices responsive to a maximum deviation of the output voltage from the reference condenser voltage to change the direction of variation of the input quantity, and re-setting devices responsive to said maximum deviation to partially discharge the reference condenser.

21. Automatic control apparatus for a system in which an output quantity is dependent on an input quantity comprising means for continuously varying the input quantity, measuring means for converting the output quantity to an output voltage, means for establishing a reference quantity equal to the peak output while the output quantity is decreasing, said means including a reference condenser to receive increments of charge from the measuring means thereby raising the reference condenser voltage to a peak valve and a rectifier to prevent loss of charge from the reference condenser, comparing devices for determining the deviation of the output voltage from said peak reference condenser voltage, means for causing a maximum deviation of the output voltage from the reference condenser voltage to generate a pulse, a flip-flop circuit responsive to said pulse to change the direction of variation of the input quantity, and re-setting devices responsive to said pulse to partially discharge the reference condenser.

22. Automatic control apparatus for an internal combustion engine in which an output quantity is dependent on two input quantities, namely, air fuel ratio and ignition timing, comprising measuring apparatus for repeatedly generating an electric signal which is a measure of said output quantity, peak-searching means for varying one of said input quantities in opposite directions, means for detecting the rate of change of electric signal with respect to input, means responsive to a change in said rate of change from positive to negative to reverse the direction of input variation, and selector means for periodically shifting the peak-searching means to vary the other input quantity.

CHARLES STARK DRAPER.
YAO T. LI.

REFERENCES CITED

The following references are of record in the file of this patent:

UNITED STATES PATENTS

| Number | Name | Date |
|---|---|---|
| 2,404,568 | Dow | July 23, 1946 |
| 2,415,799 | Reifel et al. | Feb. 11, 1947 |